United States Patent [19]

Goris

[11] Patent Number: 4,708,524

[45] Date of Patent: Nov. 24, 1987

[54] REMOTE GUIDELINE CONNECTOR

[75] Inventor: Gregg A. Goris, Oxnard, Calif.

[73] Assignee: Vetco Gray Inc, Houston, Tex.

[21] Appl. No.: 778,031

[22] Filed: Sep. 20, 1985

[51] Int. Cl.$^4$ ............................................. E21B 7/12
[52] U.S. Cl. .................................. 405/169; 405/166;
405/191; 403/315; 403/322
[58] Field of Search .............. 405/169, 170, 171, 166,
405/38–43, 224, 191; 403/315, 316, 317, 325,
322, 327; 294/86.32, 86.30, 86.31

[56] References Cited

U.S. PATENT DOCUMENTS

| | | | |
|---|---|---|---|
| 3,356,145 | 12/1967 | Fredd | 294/86.32 X |
| 3,628,812 | 12/1971 | Larralde | 403/322 X |
| 3,709,291 | 6/1973 | Hanes et al. | 405/191 |
| 3,863,961 | 2/1975 | Dinning | 403/322 X |
| 4,024,724 | 5/1977 | Horton | 405/166 |
| 4,133,182 | 1/1979 | Chateau | 405/169 |
| 4,222,462 | 9/1980 | Ottestad | 403/316 X |
| 4,359,960 | 11/1982 | Burchett et al. | 403/297 X |
| 4,404,714 | 9/1983 | Duran | 403/322 X |
| 4,453,449 | 6/1984 | Hollmann | 403/322 X |
| 4,472,081 | 9/1984 | Lawson | 405/169 |
| 4,530,618 | 7/1985 | Stoll | 403/322 |
| 4,585,369 | 4/1986 | Manesse et al. | 403/322 |

Primary Examiner—Cornelius J. Husar
Assistant Examiner—Joseph A. Fischetti
Attorney, Agent, or Firm—Joseph R. Dwyer

[57] ABSTRACT

A guideline connector (30) capable of being inserted over the top of a guide post (12) and has releasable locking means (40) which responds to the guide post contour to resiliently lock the connector onto the guide post profile (22). The locking means includes means (82, 84) for inactivating the locking means to free the connector of the guide post (12) and for automatically resetting (80, 86) (reactivating) the locking means (40) for further use. The locking means is functionally responsive to the outer contour of the guide post (12).

4 Claims, 8 Drawing Figures

REMOTE GUIDELINE CONNECTOR

BACKGROUND OF THE INVENTION

This invention relates to connectors for guidelines used in guideline type subsea well systems.

In guideline type subsea well systems, guidelines extend from the ocean floor to the platform for guiding equipment to and from the well bore. The structure exposed at the top of the well bore, includes a plurality of vertical guide posts to which the guidelines are connected.

There now exists guideline connectors for releasably connecting the guidelines to the guide posts, which are disclosed in the U.S. Pat. No. 3,709,291 to Hanes, et al. This patent also discloses apparatus for cutting failed guidelines and the use of the connector for reconnecting a new guideline onto the guide posts.

The guideline connector shown in the foregoing Hanes, et al, patent is widely used but, during such use, it has been found that sometimes disconnecting or releasing the guideline has been difficult. The actual locking mechanism of the Hanes, et al, guideline connector, once rendered inoperative to allow the guideline connector to be pulled off the guide post, depended solely on weight, and often debris, rust, and the like, interfered with the weight releasable means and thus prevented its release. Any pull in the connector had no effect on mechanism to release the connector.

It is an object of this invention to provide a new and improved remote guideline connector for connecting guidelines to underwater apparatus which includes a positive means for releasing the connector from its guide post and also includes means for resetting the connector automatically.

Thus, in the broadest sense, it is a primary object of this invention to provide a remote guideline connector which is an improvement over prior art guideline connectors.

SUMMARY OF THE INVENTION

The guideline connector which meets the foregoing objects is capable of being inserted over the top of a guide post and has releasable locking means which resiliently responds to the guide post contour yet positively locks the connector onto the guide post profile. The locking means has means for inactivating the locking means to free the connector of the guide post and for automatically resetting (reactivating) the locking means for further use. The locking means is functionally responsive to the outer contour of the guide post top.

DETAILED DESCRIPTION

Figure 1:
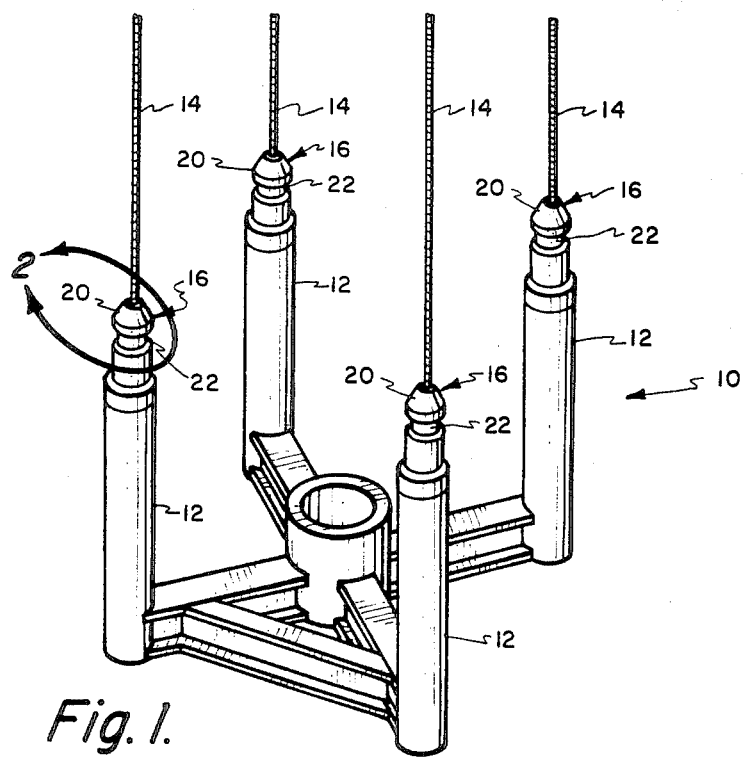
FIG. 1 is a prospective view of a permanent guide base for use in subsea well systems and illustrating guidelines connected thereto.

FIG. 1 illustrates a typical wellhead apparatus 10 to be located at the top of a subsea well bore. This apparatus is sometimes called a guide base and is shown with four vertically disposed guide posts 12. Guidelines 14 are attached to these guide posts for guiding equipment to and from the well bore during subsequent well operations. It is understood that, while four guide posts are shown and are standard in the industry, the number of such guide posts may vary considerably depending on the needs of the subsea well system. The guidelines 14 are shown connected directly to the guide posts. In this case, the guideline connectors would be used to reconnect new guidelines to the guide post if the guideline had broken and was then cut by a cutter such as shown in the Hanes, et al, patent. The guideline may also be connected to the guide posts in the first instance by guideline connectors. This option is within the province of the rig operator.

Figure 2:
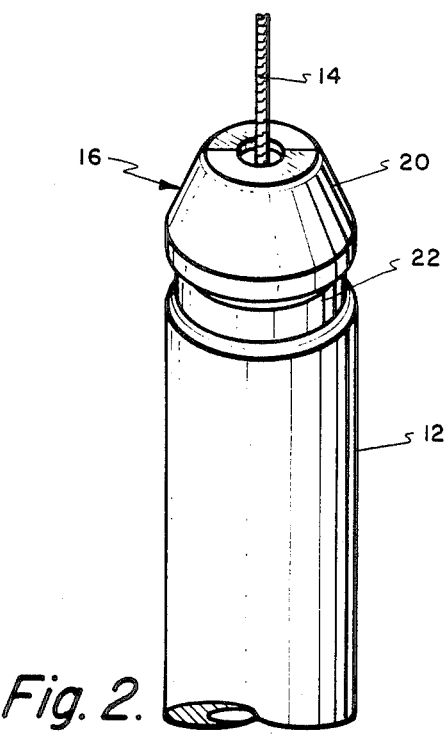
FIG. 2 is an enlarged top portion of a guide post in the area encircled by the arrow 2 in FIG. 1.

As more clearly shown in FIG. 2, each of the tops 16 of these guide posts 12 are tapered conically as at 20 and provided with a peripheral, external connecting groove or profile 22 below the tapered tops for connecting a guideline connector thereto. The guide posts are standardized and heretofore the guideline connector for connecting the guidelines 14 to the guide posts were as shown in the Hanes, et al, patent, supra.

Figures 3, 4:
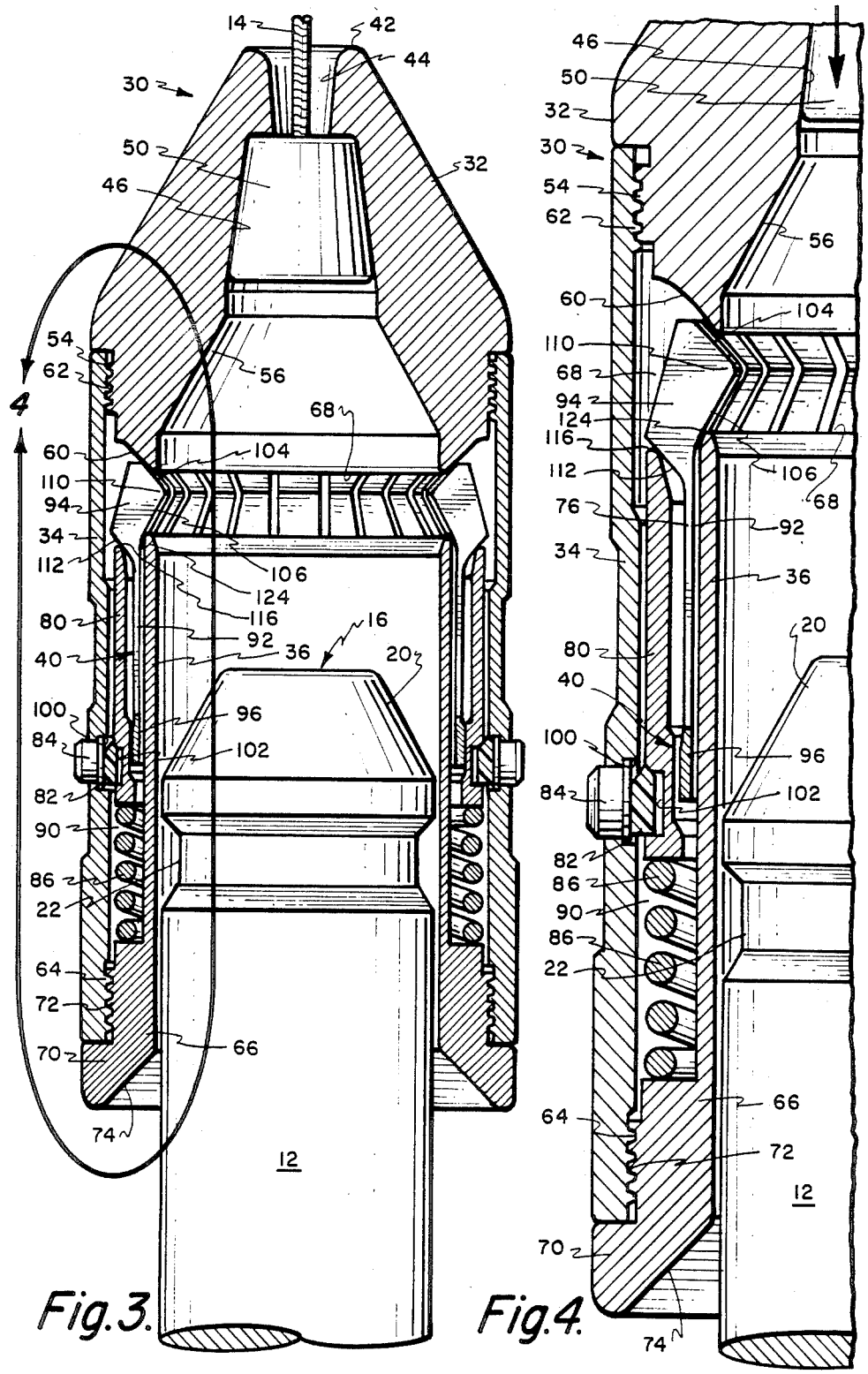
FIG. 3 illustrates the guideline connector of this invention being installed over a guide post.
FIG. 4 is a portion of the guideline connector enlarged over the illustration in FIG. 3 in the area encircled by the arrow 4.

FIG. 3 illustrates a guideline connector 30, constructed in accordance with this invention, which will operate on the standardized guide posts 12 without requiring any modification of the guide posts and existing tools for releasing the guideline connector, such as shown in the Hanes patent, may be used.

It can be seen that the guideline connector body 30 comprises a top body section 32, having a depending outer sleeve section 34 attached thereto, an inner sleeve section 36, and a guide post lock-release-reset mechanism, identified in its entirety as 40, and referred to above as the locking means. The inner diameter of the inner sleeve 36 is sufficient to allow the entry of a guide post 12 as shown in this figure.

The top body section 32 is conical in form, tapering inwardly toward the nose 42, which has an opening 44 for the passage of the guideline 14, the latter being fixed within an internal cavity 46 by a spelter socket 50 and a radially disposed set screw (not shown). The top body section is thickest of the sections and is provided with external threads 54 on its lower outer rim. The top body section is also formed with a conical cavity 56 to receive the top conical portion 20 of the guide post and is also tapered in the opposite direction as at 60 where the top body section joins the outer sleeve 34. The latter top section joins the outer sleeve 34. The latter accommodates the guide post lock-release-reset mechanism 40 as will be clear from the description hereinafter. The outer sleeve section 34 is a relatively thin cylinder of a length suitable to contain the lock-release mechanism and the top 16 of the guide post 12 and its profile 22. It is also provided with internal threads 62 at its upper end which coengage with the threads 54 on the top body section. The outer sleeve section is further provided with internal threads 64 on its lower end.

The inner sleeve section 36 is spaced from the inner diameter of outer sleeve section 34 by a thick end portion 66 and extends upwardly of the outer sleeve section a major portion of the latter's length but terminates a distance below the top body section 32 to provide a circumferential space or opening 68 to permit operation of the guide post latch-release-reset mechanism 40. The thick end portion 66 is externally threaded as at 72 to coengage with the internal threads 64 on the outer sleeve section 34. The thickened portion 70 is conically shaped to define a guide or mouth 74 to facilitate reception of the guide post and, of course, is of an inner diameter sufficient to allow the guide post to enter.

The lock-release-reset mechanism 40 comprises a collet 76, a movable sleeve 80, a split ring 82, radially extending buttons 84 engaging the split ring 82, and a helical spring 86, all substantially within space 90 between the inner and outer sleeve section.

The collet 76 is essentially a cylinder with a thick top portion and slotted lengthwise in several places substantially its length to provide a plurality of resilient fingers 92 with locking dogs 94, held together near their lower end by portion 96 which is essentially a ring. The dogs 94, thus being resiliently mounted, are capable of moving radially so that the dogs 94 move in and out through the circumferential space 68 to engage and disengage the guide post 12.

The collet 76 is of a diameter to slideably engage the outer surface of the inner sleeve section 36 and is telescoped within the movable sleeve 80. The collet is actually free floating in the sense that it may move upwardly and downwardly of the inner sleeve section.

The movable sleeve 80 is positioned in the connector by the split ring 82 which seats in a pair of opposing peripheral grooves 100 and 102 in the outer sleeve section 34, and in the movable sleeve 80 respectively. As shown in FIG. 3, the split ring 82 is positioned in both grooves and is engaged by the actuating buttons 84 spaced about the circumference of the outer sleeve section. These actuating buttons 84 are located in suitable openings in the outer sleeve section and extend outwardly of the outer sleeve to be actuated by hand or by a tool to move the split ring radially inwardly out of the groove 100 to permit the movable sleeve 80 to move downwardly against the bias of the helical spring 86. While a helical spring is shown, any suitable spring or resilient means may be used and the tool for depressing the buttons may be of several configurations such as the one shown in the Hanes, et al, patent, supra.

Each of the dogs 94 are shaped to function as a locking mechanism to positively lock the connector onto the guide post, to respond to the contour of the guide post, and to be reset automatically after the connector is removed from the guide post. To do this, the dogs 94 have an upwardly facing tapered wall 104 which substantially parallels the taper 60 on the top body section 32 and a downwardly and inwardly facing tapered wall 106 which defines a corner 110 therebetween. A third tapered wall 112 is provided that is outwardly and downwardly facing and in the embodiment shown, the length of this tapered wall 112 is slightly less than tapered wall 104.

As shown in FIGS. 3 and 4, the tapered wall 112 engages the chamfered edge 116 of the movable sleeve 80, and, as shown, before the dogs 94 are engaged by the guide post 12, they are in their resiliently neutral position but locked by the chamfered edge 116 since this edge is immovable at this stage.

Figure 5:
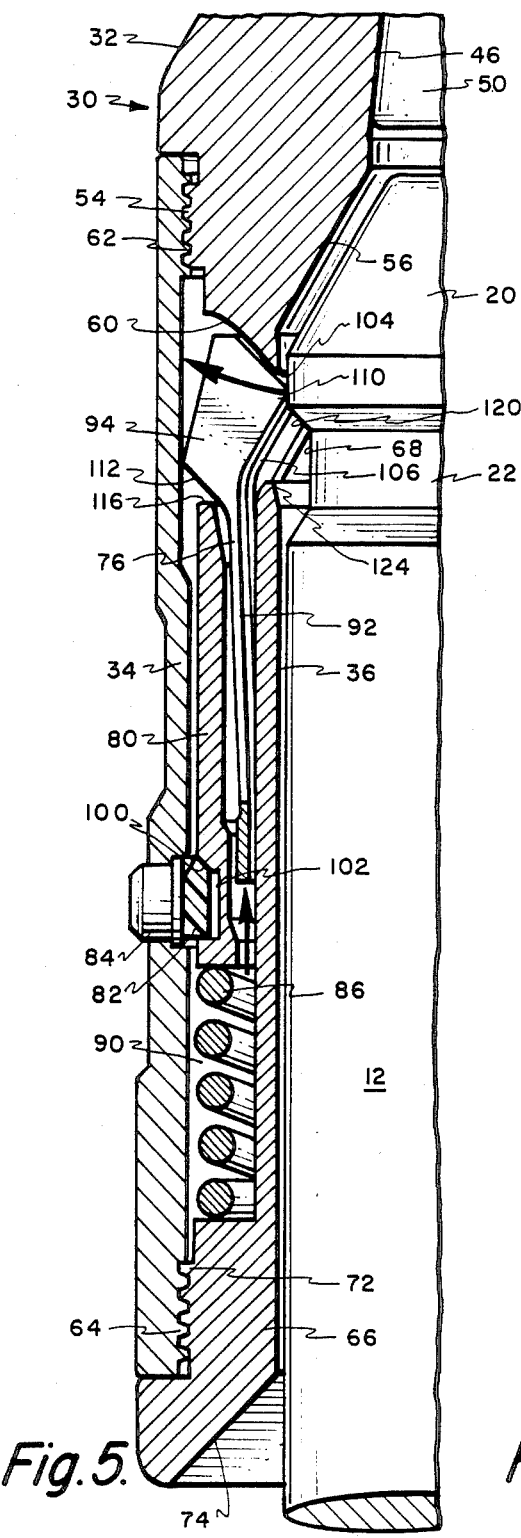
FIG. 5 is a view similar to FIG. 4 and illustrates the response of the locking mechanism upon movement of the guideline connector downwardly over the guide post.

FIG. 5 illustrates the connector being further lowered over the guide post 12 to a point where the corners 110 of the dogs engage and are activated by the contour of the guide post, i.e., the corners first engage the conical surface 20 and then the cylindrical surface above the profile 22. The collet, being free floating, is thus moved upwardly against surface 60 and radially outwardly, by the contour of the guide post as represented by the two arrows.

Figure 6:
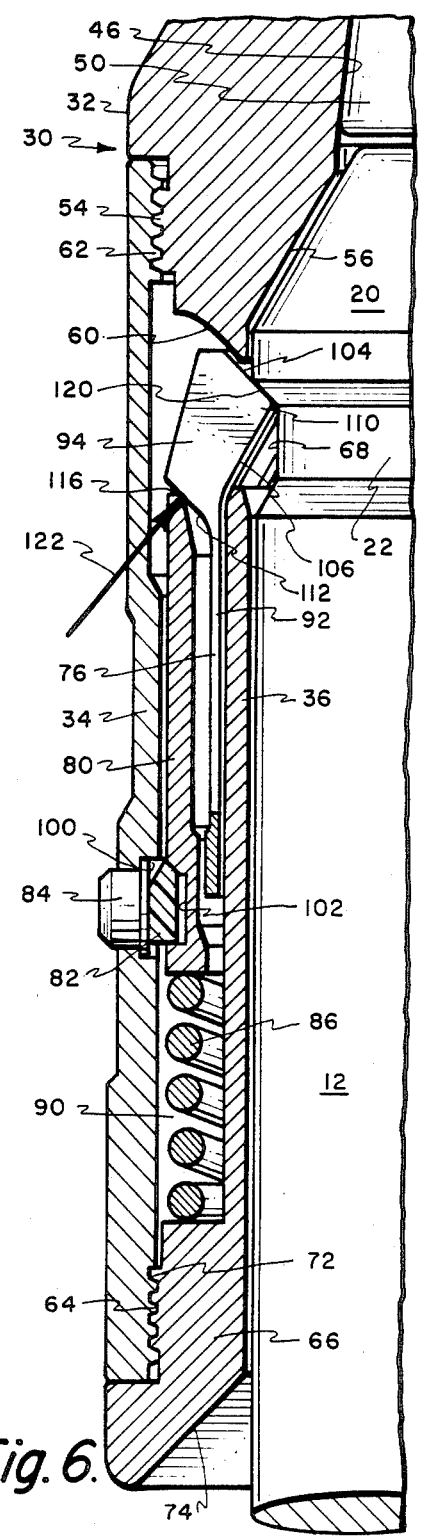
FIG. 6 is similar to FIGS. 4 and 5 and illustrates the guide post lock within the guideline connector.

FIG. 6 illustrates the shoulder 120 of the profile 22, having passed the corners 110 of the dogs and the resilient action of the collet finger serving to force the dogs into the profile 22, thereby locking the connector onto the guide post. The chamfered edge 116 on the movable sleeve 80 thus positively locks the dog in the profile. This direct positive lock is represented by arrow 122.

Figure 7:
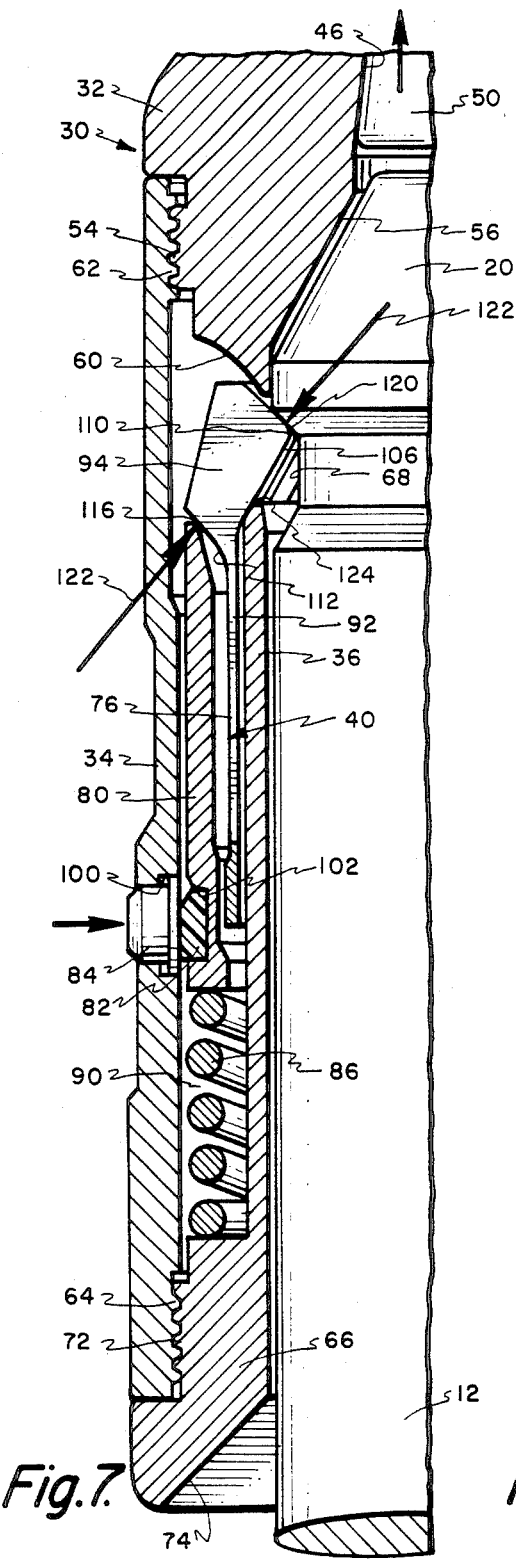
FIG. 7 is similar to FIGS. 4-6 and illustrates the initial step in the release of the connector by the compression of the buttons moving the split ring t:ly within the connector, FIG. 8. is similar to FIGS. 4-7 and illustrates the response of the locking mechanism as the guideline connector is retracted.
Figure 8:
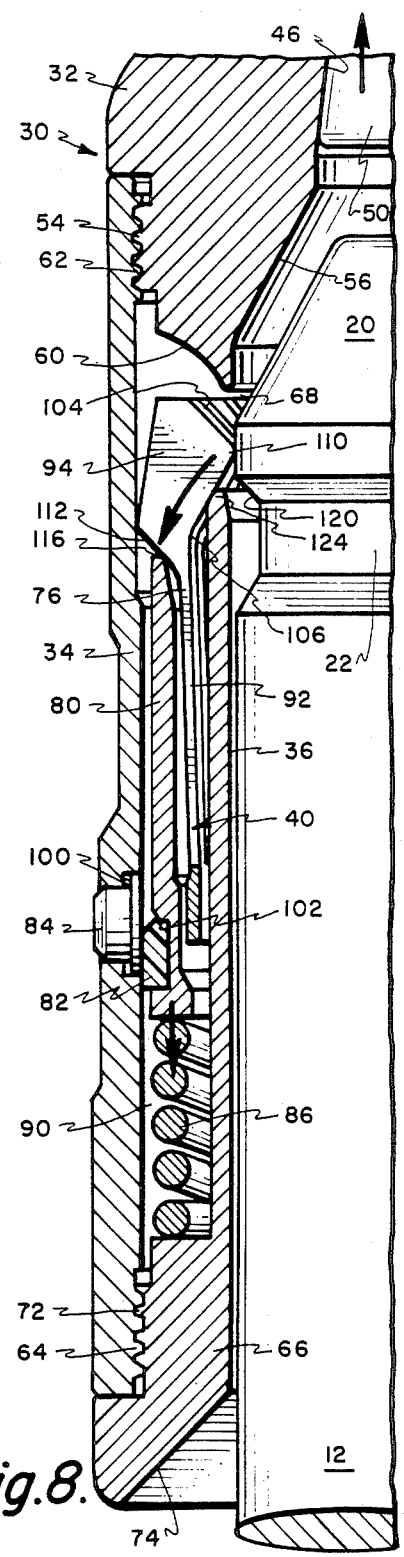

FIG. 7 illustrates the initiation of the release of the connector 30 from the guide post 12 by the radially inward movement of the activating buttons 84, thereby moving the split ring 82 out of the groove 100 in the outer sleeve 34. When the split ring 82 is free of this groove 100, the movable sleeve 80 is free to move downwardly against the reset springs 86 as shown in FIG. 8. Surface 106 on the dogs 94 moving against cam end 124 on the inner sleeve section 36 is the means by which the dogs are retracted. Again, the dogs 94 are responsive to the contour of the guide post and tend to move radially outwardly out of the profile 22 and, with the movable sleeve 80 now free to move downwardly, the tapered wall 112 of the dogs, engaging the chamfered edge 116 force the downward movement of the movable sleeve 80. It is apparent that, after the corner 110 of the dog is past the maximum diameter of the guide post above the profile and the conical section 20, the spring 86 will react to move the movable sleeve 80 upwardly to a point where the split ring will again reenter the groove 100 in the outer sleeve 32 to reset the locking mechanism such as in a position in FIGS. 3 and 4.

I claim:

1. A guideline connector for connecting a guideline to a guideline post, comprising,
    a body having means for retaining a guideline therein and having an inner diameter sufficient to receive a guide post top,
    locking means including resiliently mounted axially and radially moveable dogs which in an intial position are responsive to the contour of said guide post as the connector is inserted over the guide post to lock the said connector onto to said guidepost,
    said locking means further including an inner sleeve, a collet, slideable over said inner sleeve and a moveable sleeve telescoped over part of said collet and together with said inner sleeve engages said collet to lock said collet onto said guide post, and
    means for deactivating said locking means prior to withdrawal of said guide post thus allowing the connector to be withdrawn from said guide post,
    said deactivating means including means for resetting said locking means automatically to said initial position,
    said deactivating means including said movable sleeve which is locked against movement by said resettable means and which is unlocked to free said guide post of said collet and to set said resettable means in condition to automatically reset said collet after said connector has been withdrawn from said guide post.

2. The connector as claimed in claim 1 wherein said collet moves said movable sleeve and sets said deactivating means as said connector is withdrawn from said guide post.

3. A guideline connector for connecting a guideline to a guide post comprising:

a body having means for retaining a guideline therein and having a depending outer sleeve;

said body having an inner diameter sufficient to receive a guide post top, said outer sleeve having a diameter sufficient to receive a guide post lock-release-reset mechanism and a guide post;

said guide post lock-release-reset mechanism comprising, an inner sleeve within and spaced from said outer sleeve with an end terminating a distance from said body to provide a circumferential space between said body and said end, an axially movable collet with resiliently mounted locking dogs which are capable of moving radially and axially of said circumferential space to engage and disengage the top of said guide post, a movable sleeve between said collet and said outer sleeve having one end positioned in engagement with said locking dogs, means releasably locking said movable sleeve in engagement with said locking dogs, said locking dogs being capable of moving both radially outwardly and axially of said position of engagement with said movable sleeve in response to the contour of said guide post top when said guide post top enters said body but incapable of moving out of engagement with said movable sleeve after said guide post top is in final position in said body, unless said releasable locking means is first actuated to allow said movable sleeve to move axially relative to said body in response to movement of said guide post top acting upon said locking dogs thereby allowing said locking dogs to move, and means biasing said movable sleeve toward said position of engagement with said locking dogs to automatically reset said movable sleeve in locked engagement with said locking dogs.

4. The guidline connector as claimed in claim 3 wherein each of said locking dogs has a locking surface disposed at an angle to the axis of said movable sleeve which locking surface is engaged by said movable sleeve to lock each of said locking dogs against a surface on said guide post top which is parallel to said locking surface.

* * * * *